United States Patent [19]

Sanjana et al.

[11] Patent Number: 4,482,659
[45] Date of Patent: Nov. 13, 1984

[54] TOUGHENED THERMOSETTING COMPOSITIONS FOR COMPOSITES

[75] Inventors: Zal N. Sanjana, Verona; Joseph R. Marchetti, Greensburg, both of Pa.

[73] Assignee: Westinghouse Electric Corp., Pittsburgh, Pa.

[21] Appl. No.: 544,150

[22] Filed: Oct. 21, 1983

[51] Int. Cl.$^3$ .................. C08G 59/42; H01B 3/40; B29D 3/02

[52] U.S. Cl. .................. 523/414; 156/330; 427/386; 428/268; 525/119; 525/121; 525/122

[58] Field of Search ............... 523/414; 525/119, 121, 525/122; 427/386; 428/268; 156/330

[56] References Cited

U.S. PATENT DOCUMENTS

| | | | |
|---|---|---|---|
| 2,879,252 | 3/1959 | Been et al. | 156/330 |
| 3,027,337 | 3/1962 | Tritsch | 156/330 |
| 3,058,931 | 10/1962 | Petty | 524/733 |
| 3,100,160 | 8/1963 | Korpman | 428/268 |
| 3,297,598 | 1/1967 | Mills | 525/122 |
| 3,297,608 | 1/1967 | Noshay et al. | 528/119 |
| 3,326,741 | 6/1967 | Olson | 427/386 |
| 3,578,548 | 5/1971 | Wesp | 156/330 |
| 3,639,500 | 2/1972 | Muny et al. | 525/119 |
| 3,894,113 | 7/1975 | Pagel | 525/122 |
| 3,966,837 | 6/1976 | Riew et al. | 525/122 |
| 4,075,148 | 2/1978 | Zatmann | 523/402 |
| 4,130,546 | 12/1978 | Goto et al. | 525/122 |
| 4,244,850 | 1/1981 | Mylonakis | 523/402 |
| 4,263,362 | 4/1981 | Straka | 428/258 |
| 4,297,261 | 10/1981 | Jozwiak | 525/530 |
| 4,383,879 | 5/1983 | Le Du et al. | 156/330 |

FOREIGN PATENT DOCUMENTS

| | | | |
|---|---|---|---|
| 52-30837 | 3/1977 | Japan | 156/330 |
| 56-8474 | 1/1981 | Japan | 156/330 |
| 56-120726 | 9/1981 | Japan | 525/122 |
| 57-70654 | 5/1982 | Japan | 156/330 |
| 736457 | 9/1955 | United Kingdom | 525/122 |
| 833649 | 4/1960 | United Kingdom | |
| 2045767 | 11/1980 | United Kingdom | 156/330 |

OTHER PUBLICATIONS

Drake et al., "Elastomer–Modified Epoxy Resins for Structural Applications", Sampe Quarterly, Jul. 1975, pp. 11–21.

*Primary Examiner*—Ronald W. Griffin
*Attorney, Agent, or Firm*—R. D. Fuerle

[57] ABSTRACT

Disclosed is a water based thermosetting epoxy composition of a water compatible epoxy resin, about 5 to about 35% based on total solids of a water polymerized impact modifier in a water based latex, about 1.5 to about 7% based on the weight of the epoxy resin of a water compatible epoxy hardener, up to about 0.3% based on the weight of the epoxy resin of a catalyst, and sufficient water to provide a viscosity of about 100 to about 400 centipoises. The compositions are used to prepare high impact strength, high damping laminates.

18 Claims, No Drawings

TOUGHENED THERMOSETTING COMPOSITIONS FOR COMPOSITES

BACKGROUND OF THE INVENTION

In recent years the demand for filamentary reinforced composites having improved mechanical properties has risen due to new applications in magnetic fusion energy, magnetohydrodynamics, and a variety of industrial and aerospace components. Epoxy resins are widely used in making these composites because they convert from a liquid or thermoplastic state to a chemically resistant thermoset solid state without the evolution of volatile materials. Also, epoxy resins exhibit the strength, adhesion, chemical resistance, and cure versatility that these composites require.

Epoxy resins are especially suitable for laminating applications where a "prepreg" or resin impregnated substrate of a fibrous material must be prepared. The epoxy resin in combination with curing agents and optional additives is usually dissolved in a suitable solvent, deposited or impregnated onto the substrate, and partially cured (B-staged) to produce a dry or, in some cases, a tacky resin impregnated substrate. The B-staged prepreg is then optionally stacked or individually laminated (fully cured) by application of heat and pressure.

Because epoxy resin systems are inherently brittle, it is difficult to produce composites having mechanical properties associated with "toughness" such as impact and crack resistance. While some toughened epoxy resins have been produced by modifying the epoxy resin with various low molecular weight carboxylic elastomers, the resulting composites still lack the impact strength desired for many modern high technology applications. The incorporation of higher molecular weight elastomers into an epoxy matrix has not been possible because the higher molecular weight elastomers are not readily soluble in the epoxy resins nor are the epoxy resins readily soluble in the elastomers. Also, because of thermodynamic considerations, it is not normally possible to dissolve both the epoxy resin and a high molecular weight elastomer in a common solvent.

SUMMARY OF THE INVENTION

We have discovered that high molecular weight elastomers can be incorporated into epoxy resins without mutual coagulation to produce a composition having the low viscosity required for impregnation. This is accomplished by using elastomers which are in latex form, and are produced by emulsion polymerization, and by using epoxy resins which are water dispersible. The toughened thermo-setting compositions of this invention have been used to make composites which have higher impact strengths than composites previously prepared from the low molecular weight elastomers.

DESCRIPTION OF THE INVENTION

The composition of this invention is a water-based impregnant, which is an intimate stable mixture of a water dispersible epoxy resin, an impact modifier in latex form, a water compatible epoxy hardener, and sufficient water to produce the desired viscosity. The composition may also include various fillers and a catalyst to promote cure of the epoxy resin.

Any epoxy resin which is water dispersible or water emulsifiable may be used in the composition of this invention. These epoxy resins are normally furnished in water but they may contain a few percent of an organic solvent such as methyl cellosolve as a coupling agent. The epoxy resin should have a pH between about 6 and about 8 as lower and higher pH values result in the hydrolysis of the oxirane groups. Examples of types of epoxy resins which may be used in this invention include diglycidyl ethers of bisphenol A, diglycidyl ethers of bisphenol S, novolak epoxies, cycloaliphatic epoxies, hydantoin based epoxies, and prebrominated epoxies.

The impact modifier is a polymer which forms a discontinuous phase in the continuous phase of the epoxy resin upon curing. The impact modifier is in the form of a water based latex, which is a type of emulsion. These impact modifiers are synthesized (i.e., polymerized) in water with no organic solvent being present.

The impact modifiers used in the composition of this invention are copolymers of butadiene and a monomer copolymerizable therewith in an emulsion polymerization process. Examples of such copolymerizable monomers include acrylonitrile, styrene, methyl methacrylate, acrylic acid, and methacrylic acid. These copolymers may be lightly carboxylated by including less than one percent of acrylic acid or methacrylic acid in the copolymerization process (actually forming a terpolymer). Examples of lightly carboxylated butadiene copolymers include the butadiene-acrylonitrile copolymers. Carboxylation of the impact modifier can lead to increased cross-linking with the epoxy resin but carboxylation has not been found to increase the mechanical properties of the composite, except that the increased compatibility seems to improve its damping characteristics. Carboxylation is accomplished by copolymerization with acrylic acid or methacrylic acid so that the resulting impact modifier has an acid number of about 0.5 to about 10 mg KOH/mg (based on solids). The noncarboxylated copolymers include polybutadiene grafted with styrene and/or methyl methacrylate, and the acrylonitrile-butadiene-styrene polymers. These copolymers must have a glass transition temperature (Tg) of less than $-20°$ C. as higher glass transition temperatures can result in a loss of impact strength in the composite. A molecular weight of between about 500,000 and 10,000,000 is preferred as lower molecular weight copolymers result in less impact strength in the composite and higher molecular weight polymers may prevent the composition from flowing in the laminating press.

The epoxy hardener performs the function of cross-linking the epoxy resin. While virtually any of the common epoxy hardeners can be used, such as dicyandiamide or various amino hardeners, the preferred epoxy hardener is dicyandiamide because it is very water soluble. Any hardener used should be water soluble or water dispersible.

It is preferable to include an epoxy catalyst in the composition to speed up the cross-linking reaction of the hardener with the epoxy resin. The catalyst used will depend upon the particular hardener selected. The preferred catalyst is 2-methylimidazole because it works well with dicyandiamide, the preferred hardener. Other catalysts which may be used include tertiary amines such as benzyldimethylamine, dimethylamino phenols, and other amines. The catalyst must also be water soluble or water dispersible.

The composition may include various optional components such as fillers. Common fillers include calcium carbonate, aluminum trihydrate, and silica gels.

The composition comprises the epoxy resin, about 5 to about 35% (by weight based on total solids weight) of the impact modifier, about 1.5 to about 7% (based on epoxy weight) of the hardener, and up to about 0.3% (based on epoxy weight) of the catalyst. The composition may also include up to about 50% (based on resin solids) of the filler. Enough water is included in the composition to produce a viscosity of about 100 to about 400 centipoises. If a lower viscosity composition is used, the fibrous substrate will not pick up enough of the composition in a single pass and more than one pass will be necessary. If a higher viscosity is used, too much of the resin of the composition will be picked up on the fibrous substrate and air may be entrained in the composition.

While the composition may be prepared in any order, it is preferable to dissolve the hardener in water, then add the catalyst, then add the dispersion in water of the epoxy resin, and finally add the impact modifier in water, all with vigorous stirring. The impregnation of a fibrous substrate may be conducted in a conventional manner as is well-known in the art. The fibrous substrate may consist of paper, cloth, synthetic fabric, or other suitable materials. Impregnation can be performed at room temperature, preferably at a ratio of about 30 to 50% resin solids and about 50 to 70% fibrous substrate. After the fibrous substrate has been impregnated with the composition, the impregnated substrate is heated to evaporate the water, which coacervates or coagulates both phases, and to B-stage the epoxy resin. This can be accomplished at a temperature of about 120° to about 180° C. The resulting B-staged prepregs are stacked in a press and are laminated, typically at about 150° to 220° C. and about 500 to about 1000 psi. The composition can also be spray dried, which is accomplished by misting the composition in hot air to evaporate the water and produce a B-staged powder. The B-staged power then can be compression molded or injection molded under heat and pressure, as is known in the art, to produce various shaped products. The resulting product, when cured, has a discontinuous rubbery phase dispersed uniformly throughout a hard, glassy continuous cross-linked epoxy phase.

The following examples further illustrate this invention.

EXAMPLE 1

A polymerization charge was prepared using a butadiene emulsion homopolymer supplied by Goodyear under the trade designation "LPM 2374" at 45.5% solids in water, stabilized with a synthetic anionic surfactant, and containing no inhibitor, having a molecular weight in the range of $1.0 \times 10^6$. The following table gives the composition of the polymerization charge.

| Material | Function | wt (gm) | wt (gm) NV | wt % NV |
|---|---|---|---|---|
| "LMP 2374" | Grafting Substrate | 1098.9 | 500.0 | 49.38 |
| Styrene | Grafting Monomer | 269.4 | 269.4 | 26.61 |
| Methyl Methacrylate | Grafting Monomer | 230.4 | 230.4 | 22.77 |
| $K_2S_2O_8/D.H_2O^{2*}$ | Catalyst Solution | 2.5/100 | 2.5 | 0.25 |
| $A-103/D.H_2O^{2*}$ | Surfactant Solution | 33.3/200 | 10.0 | 0.99 |
| $D.H_2O^2$ | Solvent | 599.0 | — | — |

*de-ionized water

In preparing the charge, 1098.9 grams of the "LPM 2374" was charged into a 3000 ml round bottom, four necked flask fitted with an agitator, nitrogen inlet tube, thermometer, dropping funnel, and a means for heating. The flask was swept with nitrogen gas for five minutes and the flow rate was adjusted to maintain a slight positive nitrogen pressure throughout the balance of the run. The agitator was started and 599 grams of deionized water was slowly introduced into the flask followed by the addition of 33.3 grams of an anionic surfactant sold by American Cyanamide under the trade designation, "A-103." The surfactant was predissolved in 200 grams of de-ionized water. (Additives designed to control emulsion pH or promote catalytic efficiency, if so desired, could be added at this stage in the polymerization scheme.)

Following the addition of the de-ionized water and the surfactant, the flask contents were slowly heated to 55° C. and 2.5 grams of potassium persulfate ($K_2S_2O_8$) initiator predissolved in 100 grams of de-ionized water was charged. Pre-mixed monomers (269.4 grams of styrene and 230.4 grams methyl methacrylate) were transferred to the dropping funnel and added dropwise into the flask. The polymerization was permitted to exotherm but was maintained between 65°–68° C. during the subsequent two hour addition period. After the monomers were added an additional one gram of potassium persulfate catalyst pre-dissolved in 50 grams of de-ionized water was charged to the flask and the polymerization mixture was stirred and heated at 68° C. for an additional two hours. Following the two hour 68° C. hold, the resultant emulsion was cooled to room temperature, strained through a fine mesh, stainless steel screen to remove the less than 0.5% by weight of coagulum present and was stored for evaluation. This product is designated as composition L in the table which follows.

Various other compositions were prepared using a non-ionic aqueous dispersion of a diglycidyl ether of bisphenol A epoxy resin having an epoxy equivalent weight of 640 gram equivalents (on solids) supplied at 60% total solids in water by Celanese Plastics and Specialties Company under the trade designation "CMD 35201." The compositions also included dicyandiamide, 2-methylimidazole (2-MI), and a lightly (<1%) carboxylated 33% by weight acrylonitrile-67% by weight butadiene copolymer water based latex produced by emulsion copolymerization, supplied at 50% solids in water, stabilized with a synthetic anionic surfactant and having a molecular weight of about $1.0 \times 10^6$, sold by Goodyear under the trade designation "Chemigum 520." The compositions were prepared by first dissolving the dicyandiamide in water using a container fitted with propeller-type agitation and a means for heating. The water was heated to 70° C. and the dicyandiamide was slowly added while agitating and maintaining the temperature at 70° C. Stirring and heating were continued for 30 minutes after the dicyandiamide had dissolved. After the dissolution of the dicyandiamide was completed, the 2-methylimidazole was added and dissolved in the solution. The solution was stirred and maintained at 70° C. for an additional 15 minutes after the 2-methylimidazole had dissolved. The solution was then cooled to 50° C. The epoxy resin was charged into a separate container fitted with an air-driven propeller-type agitator designed for high lift mixing. The agitator temperature of 180° C. for one hour. The resulting laminates were about ¼" thick and were utilized to prepare specimens for an Instrumented Charpy Impact and Short Beam Shear Testing. Compositions B, C, D, and E were also suitable for spray drying. The following table gives the compositions and the results of the tests.

|  | A | B | C | D | E | F | G | H | L |
|---|---|---|---|---|---|---|---|---|---|
| Wt. % "CMD 35201" | 97.03 | 92.18 | 87.32 | 82.47 | 72.77 | — | 87.32 | 97.03 | 84.01 |
| Wt. % impact modifiers of this Example | — | — | — | — | — | — | — | — | 13.41 |
| Wt. % Dicyandiamide | 2.77 | 2.63 | 2.49 | 2.36 | 2.08 | 2.16 | 2.49 | 2.77 | 2.48 |
| Wt. % "Chemigum 520" | — | 5.00 | 10.00 | 15.00 | 20.00 | — | 10.0 | — |  |
| Wt. % Acrylonitrile | — | 1.65 | 3.30 | 4.95 | 8.25 | 2.60 | 3.30 | — |  |
| Wt. % Butadiene | — | 3.35 | 6.70 | 10.05 | 16.75 | 12.00 | 6.70 | — | 6.70 |
| Wt. % Styrene | — | — | — | — | — | — | — | — | 3.66 |
| Wt. % 2-methylimidazole | 0.20 | 0.19 | 0.18 | 0.17 | 0.15 | 0.20 | 0.18 | 0.20 | 0.18 |
| Wt. % Methyl Methacrylate | — | — | — | — | — | — | — | — | 3.05 |
| Wt. % Solids | 48.9 | 48.9 | 49.0 | 49.0 | 49.1 |  |  |  |  |
| Viscosity, CPS | 210 | 220 | 90.0 | 80.0 | 235 |  |  |  |  |
| Resin Content of Laminates, Wt. % | 20.7 | 25.0 | 22.6 | 24.4 | 36.7 |  |  |  |  |
| B-Stage Temp., °C./ B-Stage Time, °C. | 150 6.0 | 150 6.0 | 150 6.0 | 150 6.0 | 150 6.0 | 150 5.0 | 150 6.0 | 150 6.0 | 150 6.0 |
| Molding Pressure, psi | 800 | 800 | 800 | 800 | 800 | 500 | 1000 | 1000 | 500 |
| Molding Temp., °C. | 180 | 180 | 180 | 180 | 180 | 180 | 180 | 180 | 180 |
| Time @ Molding Temp. Hr. | 1.0 | 1.0 | 1.0 | 1.0 | 1.0 | 1.0 | 1.0 | 1.0 | 1.0 |
| DMA 1 Tg, °C. | 120 | 110 | 104 | 93.0 | 93.0 |  |  |  |  |
| Wt. % "XP-4533" 2 |  |  |  |  |  | 48.82 | — | — | — |
| Wt. % Dow "661-A-80" 3 |  |  |  |  |  | 48.82 | — | — | — |
| Wt. % "1300X8 CTBN" 4 |  |  |  |  |  | 14.60 | — | — | — |
| Laminate Resin Content Wt. % |  |  |  |  |  | 35.3 | 35.3 | 33.7 | 32.7 |
| Shear Strength @ 300° K., psi |  |  |  |  |  | 5105 | 5268 | 7305 | — |
| Shear Strength @ 80° K., psi |  |  |  |  |  | 13075 | 13450 | 11275 | — |
| Total Energy ($U_T$) @ 300° K., Notched, in-lb/in$^2$ |  |  |  |  |  | 629 | 559 | 590 | 665 |
| Total Energy ($U_t$) @ 80° K., Notched, in-lb/in$^2$ |  |  |  |  |  | 1130 | 1085 | 887 | 1238 |
| Total Energy ($U_T$) @ 300° K., Un-notched, in-lb/in$^2$ |  |  |  |  |  | 712 | 68 | 640 | 850 |
| Total Energy ($U_T$) @ 80° K., Un-notched, in-lb/in$^2$ |  |  |  |  |  | 1170 | 1180 | 970 | 1435 |
| % Increase ($U_T$), Notched |  |  |  |  |  | 79.6 | 94.1 | 50.3 | 86.1 |
| % Increase ($U_T$), Un-notched |  |  |  |  |  | 64.3 | 73.5 | 51.5 | 68.8 |
| % Increase in Shear Strength |  |  |  |  |  | 156.1 | 155.3 | 54.3 | 146.1 |
| K @ 300 ° K., Notched | 52.4 | 83.4 | — | 99.2 |  |  |  |  |  |
| K @ 80 ° K., Notched | 94.2 | 161.9 | — | 184.8 |  |  |  |  |  |
| K @ 300° K., Un-notched | 59.3 | 101.5 | — | 126.9 |  |  |  |  |  |
| K @ 80° K., Un-notched | 97.5 | 176.5 | — | 214.2 |  |  |  |  |  |

1 Dynamic Mechanical Analysis
2 an adduct of an epoxy resin and a carboxy terminated butadiene acrylonitrile copolymer available from Spencer-Kellogg
3 a diglycidyl ether of bisphenol A resin solution (80% solids in acetone) available from Dow Chemical
4 a carboxy terminated butadiene acrylonitrile copolymer which is used in "XP-4533"

was set at medium speed and the solution containing the 2-methylimidazole and dicyandiamide was slowly added. The resulting solution was mixed for 15 minutes and the latex was slowly added while maintaining medium agitation. (Additives and/or fillers, as so desired, could be added at this point in the formulation scheme.) The solvent based scheme (composition F) was formulated by dissolving the ingredients in a mixture of methyl cellosolve and acetone. The mixture was agitated for an additional 30 minutes and then impregnated onto a 15"×15" piece of fiberglass cloth, style 7642, 44×20 threads per inch and 0.009 inches thick. The fiberglass cloth was dipped in the compositions and B-staged at 150° C. The B-staged prepregs were cut into 7"×7" squares and were press laminated by stacking 30 individual pieces between steel caul plates with Tedlar mold release sheets between the caul plates and the prepreg stack. The molding pressure was 1000 psi at a In the above table "rubber efficiency" (K) is defined as the total impact strength divided by the % rubber (butadiene) present in the laminate matrix resin. Rubber efficiency is the valid method for comparing the effectiveness of added rubber in improving the impact properties. In the above table composition F is a solvent based varnish which utilizes CTBN1300X8 as an impact modifier and is typical of the art developed by B. F. Goodrich. Composition G is a water based system which utilizes "Chemigum 520" and is prepared according to this invention. Composition L is also the subject of this invention. Compositions G and F contain acrylonitrile-butadiene and composition L contains butadiene, styrene, and methyl methacrylate. These materials were not charged directly to the laminated varnish but appear in the composition because they are present in a reactive state as part of the impact modifier.

For example, composition G contains 3.30% acrylonitrile and 6.7% butadiene which corresponds to 10.0% "Chemigum 520." The results given in the table clearly show that "K," the rubber efficiency, is much greater for compositions G and L than for composition F.

The above table shows that the unmodified control showed an increase of 50.3% and 51.5% in notched/unnotched impact resistance upon cool down from 300° K. to 80° K. A greater percent increase in $U_T$ notched/unnotched (94.1 and 73.5%) was observed for Laminate G, a laminate prepared according to this invention, which contained 6.7% butadiene while Laminate F, which contained 12% butadiene, showed increases in $U_T$ of 79.6% and 63.3%. Similar results were observed for shear strengths except both rubber modified laminates exhibited nearly identical increases. From these examples it can be concluded that both rubber modified laminates were toughened and not merely plasticized.

EXAMPLE 2

Compositions were prepared as in Example 1 and prepregs were prepared from the compositions and evaluated for adhesion to aluminum. The following table gives the composition of the prepregs in weight % and the conditions under which they were made. Composition J is typical of the subject of this invention and Composition K is typical of the art developed by B. F. Goodrich.

| Ingredient | I | J | K |
|---|---|---|---|
| Wt. % "CMD 35201" | 97.03 | 87.32 | — |
| Wt. % "XP-4533"[1] | — | — | 48.82 |
| Wt. % "DOW 661-A-80" | — | — | 48.82 |
| Wt. % "Chemigum-520" | — | 10.00 | — |
| Wt. % Acrylonitrile | — | 3.30 | 2.60 |
| Wt. % Butadiene | — | 6.70 | 12.00 |
| Wt. % Dicyandiamide | 2.77 | 2.49 | 2.16 |
| Wt. % 2-methyl imidazole | 0.20 | 0.18 | 0.20 |
| Preparation | | | |
| B-Stage Temperature, °C. | 150 | 150 | 150 |
| B-Stage Time, °C. | 5.0 | 5.0 | 5.0 |
| Resin Content, Wt. % | 79.0 | 60.0 | 67.0 |

[1]A low molecular weight butadiene epoxy adduct sold by Spencer-Kellog Corp. and containing the "1300 × 8 CTBM" copolymer from B. F. Goodrich.

Two pieces (9"×6" by 1/16" thick) 7075 T-6 bare aluminum which had been alkali cleaned, dichromate/sulfuric acid etched, and then epoxy primed were used in the test. The pieces of aluminum were overlapped ½" with the compositions in between. The aluminum was loaded into a cold press and heated to 180° C. for one hour under 800 psi pressure. Cool down was accomplished under pressure. One-inch wide specimens for single lap shear strength testing at 300° K. and 80° K. were cut from the 9"×7½" bonded panels. Tests were conducted according to ASTM D-2557 and ASTM D-1002. Five samples were tested at each temperature and the average results were reported. Samples tested at 800° K. were pretreated by thermally cycling them between room temperature and liquid nitrogen (80°K.) ten times. The following table gives the compositions tested and the results of the test.

| Prepreg Designation | I | J | K |
|---|---|---|---|
| Elastomer Type | None | "Chemigum 520" | "XP-4533" |
| Wt. % Elastomer | " | 10.1 | 14.6 |
| Wt. % Butadiene | " | 3.3 | 12.0 |
| Wt. % Acrylonitrile | " | 6.7 | 2.6 |
| Prepreg Resin Content, Wt. % | 79.0 | 60.0 | 67.0 |
| Shear Strength @ 300° K., psi | 4413 | 5290 | 3768 |
| Shear Strength @ 80° K., psi | 2168 | 3218 | 3728 |
| Increase in Shear Strength at 300° K., % | — | 19.9 | −14.6 |
| Increase in Shear Strength at 80° K., % | — | 48.4 | 71.9 |
| Rubber Efficiency* ("K") at 300° K., % | — | 6.03 | −1.22 |
| Rubber Efficiency* ("K") at 80° K., % | — | 14.67 | 5.99 |

*Rubber efficiency is obtained by dividing the % gain by the butadiene content

The above table shows that at 300° K. (room temperature) the adhesive compositions of this invention had an almost 20% increase in shear strength over the control composition whereas the use of low molecular weight butadiene material "XP-4533" resulted in a 14.6% decline in shear strength from that of the control. After thermal cycling when the joints were treated at 80° K., the tests showed that the compositions of this invention had an increase in shear strength over that of the control. There was a 48.4% increase for the adhesive containing the "Chemigum 520" and a 71.9% increase for the adhesive containing "XP-4533."

A better understanding of the improvement in shear strength resulting from elastomer additives can be achieved if one takes into account the differing amounts of the active elastomer (i.e., the butadiene content) of the adhesives. This may be done by normalizing with respect to the amount of butadiene present as is done in the last two rows of the above table to obtain the butadiene efficiency. This factor is much greater for the adhesive of this invention (composition J) at both test temperatures than the values of this factor obtained from the adhesive containing "XP-4533" (composition K). This demonstrates that the efficiency of butadiene utilization is much greater in the adhesive composition of this invention than in the state of the art formulations.

EXAMPLE 3

In this example, laminates were prepared and tested for damping. The compositions used were prepared from a diglycidyl ether of bisphenol A epoxy resin having an epoxy equivalent weight of 640 on a solids basis supplied at 60% total solids in water by Celanese Plastics and Specialty Company under the trade designation "CMD 35201," dicyandiamide, 2-methylimidazole, and high molecular weight polybutadiene additives. The polybutadiene additives were obtained from Borg-Warner Corporation and consisted of water emulsions of polybutadiene as a backbone having styrene and acrylonitrile side chains. The following table gives the content of those additives.

| BORG-WARNER ABS CONCENTRATES | | | | |
|---|---|---|---|---|
| Number | Non-Volatiles (Wt. %) | Average Polybutadiene Content (Wt. %) | Average Acrylonitrile Content (Wt. %) | Polybutadiene Particle Size |
| BW 27024 | 32.75 | 50 | 12.5 | Large |
| BW 27025 | 34.04 | 25 | 18.75 | Large |
| BW 27026 | 33.92 | 35 | 16.25 | Large |

-continued

BORG-WARNER ABS CONCENTRATES

| Number | Non-Volatiles (Wt. %) | Average Polybutadiene Content (Wt. %) | Average Acrylonitrile Content (Wt. %) | Polybutadiene Particle Size |
|---|---|---|---|---|
| BW 27027 | 32.45 | 40 | 15.00 | Small |

The dicyandiamide was dissolved in deionized water at 70° C. to which was added the 2-methylimidazole. The "CMD 35201" was placed in a container having a high lift mixer. With the mixer operating, the water solution of the dicyandiamide and 2-methylimidazole was added and the mix was stirred for 10 to 15 minutes followed by the addition of the ABS concentrate. The following table gives the composition, in weight %, of various formulations that were prepared.

| Ingredients | BW2 | BW4 | BW6 | BW8 | BW10 | Control |
|---|---|---|---|---|---|---|
| "CMD 35201" | 77.61 | 58.20 | 69.30 | 72.76 | 75.44 | 97.01 |
| BW 27024 | 20.00 | — | — | — | 11.17 | — |
| BW 27025 | — | 40.00 | — | — | — | — |
| BW 27026 | — | — | 28.57 | — | — | — |
| BW 27027 | — | — | — | 25.00 | 11.06 | — |
| Dicyandiamide | 2.22 | 1.65 | 1.98 | 2.09 | 2.16 | 2.78 |
| 2-methylimidazole | 0.17 | 0.13 | 0.15 | 0.16 | 0.17 | 0.21 |
| Polybutadiene | 10.0 | 10.0 | 10.0 | 10.0 | 10.0 | 0.0 |
| Acrylonitrile | 2.5 | 7.5 | 4.6 | 3.7 | 6.2 | 0.0 |

Laminates were prepared as in Example 1 and the damping properties of the laminates were tested as described in a brochure published by B&K Instruments, Inc. titled "Measurement of the Complex Modulus of Elasticity: a Brief Survey." The damping factor was measured using the resonant frequency technique described in that article at room temperature and a strain level of $5,000 \times 10^{-6}$ inches/inches. The resonant frequencies for the sample dimensions (7" long, 1" wide, ¼" thick) were in the range of 250-300 Hz. The following table gives the damping factor for each of the compositions tested along with the percent increase in damping factor which occurred as a result of adding the high molecular weight polybutadiene copolymer.

| Laminate | Resin Content (Wt. %) | Damping* Factor | Percent Increase in Damping Factor |
|---|---|---|---|
| Control | 33.8 | .0134 | 0 |
| BW2 | 34.9 | .0173 | 29.1 |
| BW4 | 32.8 | .0176 | 31.3 |
| BW6 | 32.8 | .0167 | 24.6 |
| BW8 | 33.8 | .0166 | 23.9 |
| BW10 | 32.2 | .0162 | 20.9 |

*At room temperature and $5,000 \times 10^{-6}$ in./in. strain

The above table shows that the percent increase in damping factor from using the high molecular weight polybutadiene copolymers, over the control, range from 21% to 31%.

The above table shows that markedly improved notched/un-notched impact strength resistance at 300° K. and 80° K. is obtained from modification with the impact modifier of the example. As can be seen by comparing compositions H and F with composition L. The table also shows that the impact modifier of this example provides a more efficient rubber utilization which is indicated by the K value in the above table and that modification with the impact modifier of this example provides toughening and not merely plasticization.

We claim:

1. A water based B-stageable thermosetting epoxy composition which comprises:
   (A) a water compatible epoxy resin;
   (B) about 5 to about 35%, based on total solids, of a water-dispersed emulsion polymerized impact modifier which is a copolymer of butadiene and a monomer copolymerizable therewith in an emulsion polymerization process, said copolymer having a $T_g$ of less than about −20° C.;
   (C) about 1.5 to about 7%, based on the weight of said epoxy resin, of a water compatible epoxy hardener; and
   (D) up to about 0.3%, based on the weight of said epoxy resin, of a catalyst; and
   (E) sufficient water to produce a viscosity of about 100 to about 400 centipoises.

2. A composition according to claim 1 wherein said epoxy resin is a diglycidyl ether of bisphenol A.

3. A composition according to claim 1 wherein said epoxy resin is in water having a pH of about 6 to about 8.

4. A composition according to claim 1 wherein said hardener is dicyandiamide.

5. A composition according to claim 1 wherein said catalyst is 2-methylimidazole.

6. A composition according to claim 1 wherein said copolymer has a molecular weight of about 500,000 to about 1,000,000.

7. A composition according to claim 1 wherein said impact modifier is carboxylated to an acid number of about 0.5 to about 10 mg KOH/gm, based on solids.

8. A method of making a laminate comprising:
   (1) impregnating sheets of a fibrous material with a composition which comprises
      (A) a water compatible epoxy resin;
      (B) about 5 to about 35%, based on total solids, of a water-dispersed emulsion polymerized impact modifier which is a copolymer of butadiene and a monomer copolymerizable therewith in an emulsion polymerization process, said copolymer having a $T_g$ of less than about −20° C.;
      (C) about 1.5 to about 7%, based on the weight of said epoxy resin, of a water compatible epoxy hardener; and
      (D) up to about 0.3%, based on the weight of said epoxy resin, of a catalyst; and
      (E) sufficient water to produce a viscosity of about 100 to about 400 centipoises;
   (2) heating said sheets to coacervate or coagulate said composition, evaporate said water, and B-stage said composition,
   (3) stacking said sheets, and
   (4) heating and pressing said stacked sheets.

9. A laminate made according to the method of claim 8.

10. A method according to claim 8 wherein said impregnated sheets are about 30 to about 50% resin solids and about 50 to about 70% fibrous material.

11. A method according to claim 8 wherein said heating to coacervate or coagulate said composition is at about 120° to about 180° C.

12. A method according to claim 8 wherein said heating and pressing said stacked sheets is at about 150° to 220° C. and about 500 to about 1000 psi.

13. A method according to claim 8 wherein said epoxy resin is a diglycidyl ether of bisphenol A.

14. A method according to claim 8 wherein said epoxy resin is in water having a pH of about 6 to about 8.

15. A method according to claim 8 wherein said hardener is dicyandiamide.

16. A method according to claim 8 wherein said catalyst is 2-methylimidazole.

17. A method according to claim 8 wherein said copolymer has a molecular weight of about 500,000 to about 1,000,000.

18. A method according to claim 8 wherein said impact modifier is carboxylated to an acid number of about 0.5 to about 10 mg KOH/gm, based on solids.

* * * * *